United States Patent [19]

Ludwig

[11] Patent Number: 4,938,835
[45] Date of Patent: Jul. 3, 1990

[54] APPARATUS FOR APPLYING LIQUID, PASTY OR PLASTIC SUBSTANCES TO A SUBSTRATE

[76] Inventor: Volker Ludwig, Untere Muehlewiesen 10, 7896 Wutoeschingen, Fed. Rep. of Germany

[21] Appl. No.: 265,595

[22] Filed: Nov. 1, 1988

[30] Foreign Application Priority Data

Nov. 10, 1986 [DE] Fed. Rep. of Germany ....... 3638307

[51] Int. Cl.$^5$ .......................... B29D 9/00; B05C 1/04; B29C 65/00
[52] U.S. Cl. ..................................... 156/555; 118/58; 118/64; 118/68; 118/69; 118/121; 118/202; 118/203; 118/211; 118/248; 118/259; 118/302; 156/244.11; 156/291; 156/324; 156/578
[58] Field of Search ................... 118/325, 302, 58, 62, 118/63, 64, 65, 68, 110, 114, 200, 202, 209, 224, 231, 244, 258, 266, 300, 302, 259; 156/291, 555, 324, 244.11, 578

[56] References Cited

U.S. PATENT DOCUMENTS

| 3,676,269 | 7/1972 | Schaeti | 156/291 |
| 4,360,398 | 11/1982 | Sabee | 156/324 |
| 4,671,205 | 6/1987 | Billeter | 118/325 |

FOREIGN PATENT DOCUMENTS 2130125 5/1984 United Kingdom .

Primary Examiner—Willard Hoag
Attorney, Agent, or Firm—Bachman & LaPointe

[57] ABSTRACT

In an apparatus for applying liquid, pasty or plastic substances, particularly thermoplastic substances, to a substrate with a device for melting the substances and a feed head for transferring the melted substances to the substrate via at least one nozzle orifice, the device for melting the substances comprises a melting container and a pressure container connected thereto. In order to facilitate melting, heat exchanger surfaces, particularly heat exchanger tubes are arranged in the melting container.

18 Claims, 3 Drawing Sheets

APPARATUS FOR APPLYING LIQUID, PASTY OR PLASTIC SUBSTANCES TO A SUBSTRATE

BACKGROUND OF THE INVENTION

The invention relates to an apparatus for applying liquid, pasty or plastic substances, particularly thermoplastic substances, to a substrate with a device for melting these substances and a feed head for transferring the melted substances to the substrate via at least one nozzle orifice.

Such apparatuses are e.g. used in fixing insert technology, in which a thermoplastic adhesive is applied to a textile substrate and the latter is joined to a further substrate. However, such apparatuses are also used for transferring substances to paper or similar carrier substrates.

Conventionally the substance is delivered in lump or granule form and must be melted prior to application. This usually takes place in a separate container from which then the melted substance is brought via a pump to the feed head. This pump has proved disadvantageous in that it destroys the high molecular chains from which the substances are generally formed In addition, melting takes a considerable time, because generally the entire content of the melting container must first be brought into a fluid state prior to the start of application.

Further disadvantages of known apparatuses relate to the feed head and the transfer of the substance to the substrate. In many cases nowadays use is made of a beamlike feed head, upstream of whose nozzle orifice rotates a metal cylinder, cf.DE-OS 32 48 889. The substances to be applied to the substrate through the metal cylinder Perforations often only hang within a gap region within the perforations as a result of the short contact time between substrate and metal cylinder and are not absorbed by the substrate. In order to improve this, the substance could e.g. be heated more and therefore further liquefied, but this would lead to it penetrating too deeply into the substrate and might even puncture the latter.

SUMMARY OF THE INVENTION

Therefore the objective of the present invention is to develop an apparatus of the aforementioned type, in which the substances to be applied can be easily melted and from which the substances can be discharged without using a pump and in which a transfer of the substances to the substrate is ensured, the penetration depth being controllable. Further improvements relate to the construction of the feed head.

This objective is achieved in that the device for melting the substances comprises a melting container and a pressure container connected thereto. This makes it possible, independantly of the activity of the melting container, to maintain within the pressure container a pressure, preferably under inert gas, with which the substance is transported to the feed head, so that pumps or similar transporting or conveying means are unnecessary.

Preferably the melting container contains heat exchanger surfaces with which the substances are brought into contact. For reasons of simplicity, these heat exchanger surfaces comprise heat exchanger tubes, which are arranged axiallY in the melting container. If the substance to be melted is introduced into an area above the heat exchanger surfaces, the melted part of the substance can flow along the heat exchanger tubes and collect in the area below said tubes. The heat exchanger tubes are connected to a feed pipe and a return pipe for a heat carrier, the latter preferably being thermal oil.

In order that the substance cannot slide past the heat exchanger surfaces in an unmelted state, above said surfaces or also below the same should be provided a grid or grating. In the case of substances in granular form, it may even be necessary to place on the heat exchanger tubes a film or foil made from the same material as the substance to be melted. In order to prevent the pressure breaking through the substances to be melted, it is generally necessary for the pressure to be in a bag, which then acts the substances. This pressure bag can consist of a simple film bag, which is connected to a pressure line. The flow rate of the melted substance through the heat exChanger tubes can be regulated by the heat supplied and also by the pressure. It is also possible to fill with pressure the area below the heat exchanger tubes, so that the melted substances are slowed down by the counterpressure. All this can be controlled by means of corresponding control lines. Moreover, the melting container is under the pressure of an inert gas.

It must also be possible to heat the melting container. For this purpose it comprises an inner wall and an outer wall, which between them form a circumferential space for receiving a heat carrier, which is once again preferably thermal oil. The melting container is also located in an insulating layer.

The pressure container also comprises a double-walled silo or bin, which is surrounded by an insulating casing. Into the circumferential space of the double-walled silo also issues a feed pipe for a heat carrier, which can once again be returned by means of a return pipe.

As a result of a corresponding pressure compensation between the melting container and the pressure container, the melted substance is fed into the pressure container and, independantly of a pressure in the melting container, the pressure container can be subject to the action of pressure for further conveying the substance to the feed head.

BRIEF DESCRIPTION OF THE DRAWING

Further advantages, features and details of the invention can be gathered from the following description of preferred embodiments and the attached drawings.

DETAILED DESCRIPTION

Figure 1:
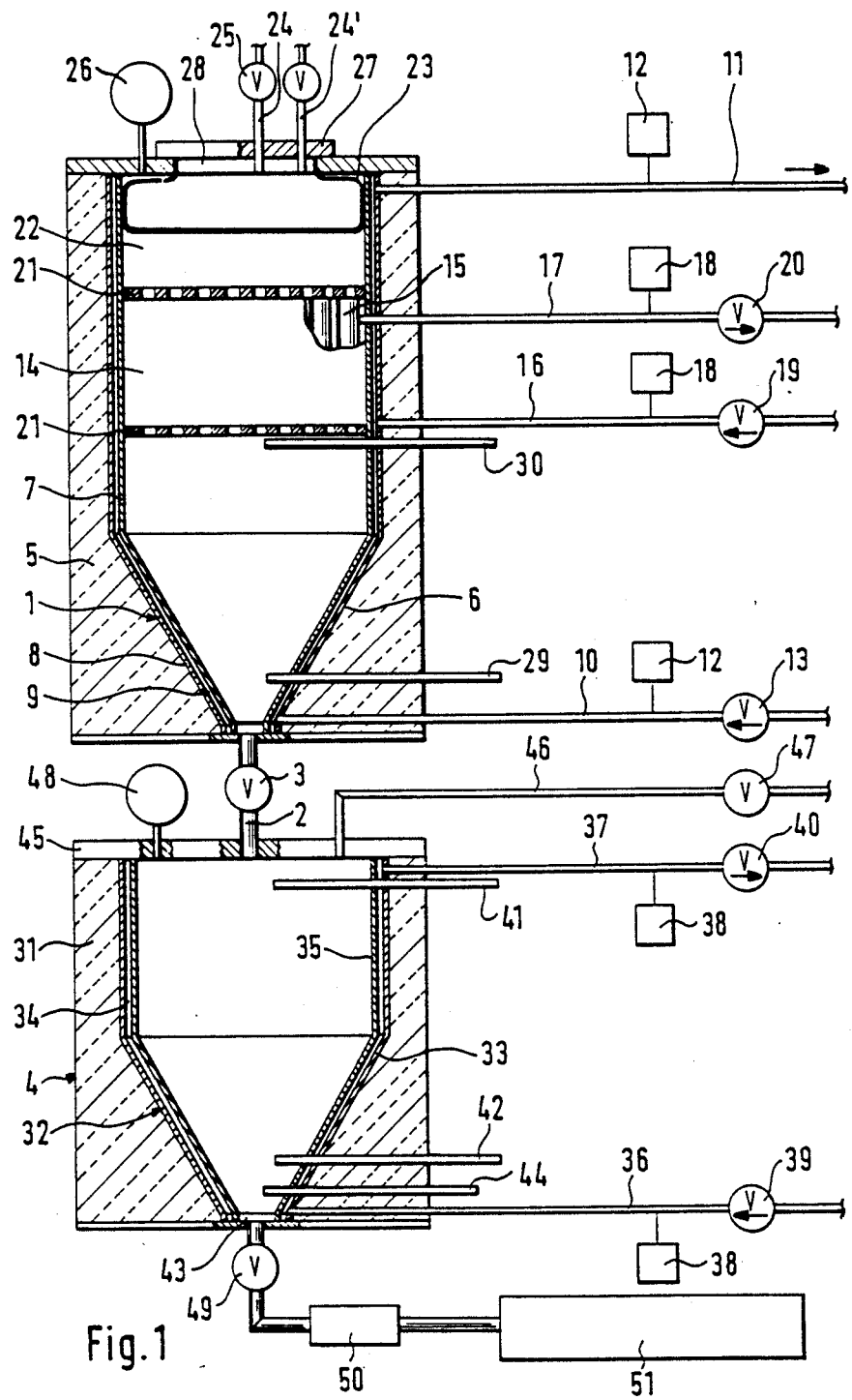
FIG. 1 shows a diagrammatic representation of an apparatus of the present invention for applying liquid, plastic or pasty substances to a substrate, partly as a block circuit diagram and partly in cross-section.

According to the invention the feed head is equipped with a nozzle orifice past which moves a perforated metal cylinder, the feed head being constructed as a beam. The subsequently described arrangement can be used both in conjunction with the aforementioned device for melting the substances and with the device described in the prior art.

The nozzle orifice in the interior of the metal cylinder is to be followed by an air nozzle which, towards the metal cylinder, forms a nozzle slit defined by lips. This air nozzle blows out the substances pressed by the nozzle orifice into the metal cylinder perforations. This blowing out takes place independantly whether or not the substances already have formed a connection with the substrate to be coated. This ensures that the substances always reach the substrate and are not left behind in the perforations.

The substrate also wraps round the metal Cylinder upstream and/or downstream of the nozzle orifice upto the air nozzle, i.e. the substrate is not only in contact with the metal cylinder in a short gap, but over a long distance, so that the substance can be joined to the substrate o the latter can be previously heated.

A cooling or heating section should be arranged between the nozzle orifice and the air nozzle outside the metal cylinder, particularly for controlling the penetration depth. Thus, e.g. if the substance is in a very liquid form, this can lead to the substance breaking through the substrate to be coated, which is undesired in many cases. However, if the substance is cooled after the nozzle orifice, such a breaking through can be prevented. It is conversely possible to remelt substances which have already passed again into a more solid aggregate state and which therefore have difficulty in adhering to the substrate by adding heat, so that they can be connected to the substrate.

It has hitherto been conventional practice to roll up again the substance-coated substrate following the feed head and only subsequently to join it to a further substrate. However, in the case of the apparatus of the present invention, the feed head or metal cylinder is to be followed by a pair of calender rollers, in which the substance-coated substrate is immediately joined to a further substrate.

Both the air nozzle and optionally the calender roller pair are, according to the invention adjustable or displaceable along the metal cylinder circumference.

The feed head also undergoes considerable improvement. According to an embodiment the nozzle orifice is connected via a slit nozzle to a ring duct in the interior of the beam. This ring duct is formed by an axial bore in the beam, in which is inserted a tube. The latter tube is connected via outlet with a gap outlet of a further feed tube. This gap outlet is preferably variable for which according to simplicity an eccentric or cam is arranged. As a result a constant pressure is maintained within the nozzle area even in the case of different quantity of feed substance, so that once again it is possible to regulate the substance penetration depth.

Between the tube and the feed tube is provided a heat carrier, which preferably is constituted by thermal oil. The large heat exchanger surface of the feed tube ensures a precise temperature control.

The nozzle orifice is preferably formed by two profile strips, which pass over the inner wall of the metal cylinder. The profile strip following the nozzle orifice cuts off the substance quantity penetrating the metal cylinder perforations, so that a minimum quantity of substance is smeared between the individual perforations, which are generally provided with an internal burr or ridge.

According to the invention, this beam is upwardly oriented with the nozzle orifice towards the metal cylinder. If e.g. for cleaning the metal cylinder or the beam, the latter is moved out of the metal cylinder, substance still present in the nozzle orifice cannot drip out. There is no need for a separate seal of the nozzle orifice, a further relief opening fulfilling this function.

In a further embodiment of the feed head, upstream of the nozzle orifice is provided an area, in which two rollers rotate in opposite directions. These rollers are provided on their circumferential surface with meshing tooth systems. This makes it possible to portion the quantity of the substance fed to the nozzle orifice and linked therewith the pressure on the substance can be increased or decreased shortly upstream of the nozzle orifice. It is also possible to relieve all pressure on the substance in the nozzle orifice, in that the rollers are rotated opposite to the feed direction.

Another embodiment of a feed head acts as a device for melting the substances, the feed head containing a feed screw by means of which the not yet melted substance can be brought into lateral ducts of the feed head. The complete feed head is heated, so that the substance in the lateral ducts melt and can flow to the nozzle orifice via corresponding bores, receptacles, feed ducts, etc.

In order to place under pressure the substance to be discharged in a simple manner it may merely be necessary to position upstream of the nozzle orifice the aforementioned area with the described rollers. This latter embodiment can only be used with specific substances, but deserves mention as a result of its very simple construction.

According to FIG. 1 in an apparatus for applying liquid, plastic or pasty substances to a not shown substrate is provided a melting container 1 which is connected to a pressure container 4 via a pipe 2, in which is provided a check valve 3 The melting container 1 essentially comprises a double-walled reception container 6 surrounded by an insulating layer 5 and which passes downwards in hopper-shaped manner to pipe 2. The inner wall 7 and outer wall 8 of reception container 6 form a circumferential space 9, which can be subject to the action of a heat carrier, e.g. a heated thermal oil. A feed pipe 10 and a return pipe 11 into or out of the circumferential space 9 are provided for said heat carrier. The feed pipe 10 and return pipe 11 are in each case monitored by thermometers 12, while a regulating valve 13 is connected into the feed pipe 10.

In the area 14 of reception container 6 a bundle of heat exchanger tubes 15 are positioned above its hoppershaped outlet and are only partly shown in FIG. 1. The heat exchanger tubes are supplied with a further heat carrier by means of a feed pipe 16 and a return pipe 17, which are monitored in each case by thermometers 18 and controlled by a regulating valve 19 or check valve 20.

The area 14 with the heat exchanger tubes 15 is separated by a grating 21 from an area 22, in which are placed substances to be melted. Thus, for example, if a granular substance is to be melted which could drop between the heat exchanger tubes 15, it is favorable to cover the grating 21 with a film of the same material as that to be melted towards the area 22 and a grating 21 can also be provided below area 14. In addition, area 22 is partly filled with a pressure bag 23, which can e.g. be made from a foil or film material.

This pressure bag 23 can be filled with a pressure medium, e.g. a gas, via a pipe 24 and the pressure medium can be controlled by a further check valve 25. This pressure bag 23 prevents a breaking through of the pressure medium when the material has not yet melted and which does not form a gas tight surface. The pressure in area 22 is also measured by a pressure gauge 26.

The pressure bag 23 can be connected to a cover 27, which closes a filling opening 28 for the substance to be melted. The cover 27 has a further connection 24' for introducing an inert or reaction gas outside the pressure bag 23, which prevents the oxidation of the substance to be melted.

The level of the melted material collecting below the heat exchanger tubes 15 is determined by two diagrammatically represented level indicators 29,30.

Pressure container 4 also comprises a silo 32 surrounded by insulating material and which has a double wall. An outer casing 33 passes around an inner casing 35, while forming a circumferential area 34, into which issues a feed pipe 36 and a return pipe 37 for a heat carrier. The temperature can be measured by means of a thermometer 38 and can be controlled by means of regulating valve 39 or check valve 40.

The level of the melted substances introduced by pipe 2 from melting container 1 is determined by level indicators 41,42. In addition, in the vicinity of the silo outlet 43 the temperature of the melted substances is determined by a further thermometer 44.

The pressure container 4 is covered by a cover 45, through which passes a pipe 46 for introducing a pressure medium, preferably an inert gas, into silo 32. A check valve 47 is provided for regulating this and the pressure is determined by means of a pressure gauge 48.

The silo outlet 47 is followed by a valve 49, as well as a filter 50 for filtering the material to be transported to a feed head 51. From said feed head 51 the material is applied to a substrate to be coated, e.g. by means of a large slit nozzle.

The apparatus of the present invention functions as follows. A heat carrier is introduced by means of feed pipe 10 or 36 both into the circumferential area 9 of melting container 1 and circumferential area 34 of pressure container 4. The temperature desired for the melting process is reached when both the feed pipe 10 and the return pipe 11 have the same temperature for approximately ten minutes. Simultaneously the heat exchanger tubes 15 are heated via feed pipe 16.

By means of the filling opening 28 a substance to be melted is now filled into area 22, the pressure bag 23 is inserted and the cover 27 closed. Pressure bag 23 via pipe 24 and the area outside pressure bag 23 via pipe 24' are now subject to the action of a pressure medium, the pressure bag 23 acting as a plunger for the substance to be melted.

The substance starts to melt as a result of the intimate contact with the heat exchanger tubes 15 or the grating 21 and the heated inner wall 7 and in this state flows between said tubes. There can be a simple regulation of the flow rate via the pressure of the pressure bag 23 and/or by regulating the temperature in the heat exchanger tubes 15. If the temperature is too low, this can to a certain extent be compensated by increasing the pressure in the pressure bag. If the temperature is too high the pressure in the pressure bag 23 is reduced.

It is also conceivable to build up a certain counterpressure in the area below the heat exchanger tubes 15, which also permits a regulation of the flow rate of the melted material.

Level indicators 29 and 30 indicate if sufficient melted substance has passed through the heat exchanger tubes 15. The melted substance can now be moved into the pressure container 4 for which purpose previously a pressure compensation is established between the melting container 1 and the pressure container 4, i.e. the pressure in container 1 is brought to that in container 4. The check valve 3 is then opened and the pressure in melting container 1 increased.

As a result of the increased pressure in melting container 1 the melted substance is conveyed via pipe into pressure container 4 or silo 32. It is obvious that not shown safety valves are provided to allow excess pressure medium to escape. As soon as melted substance is required, valve 49 is opened and the substance flows under pressure in pressure vessel 4 through filter 50 to feed head 51.

Figure 2:
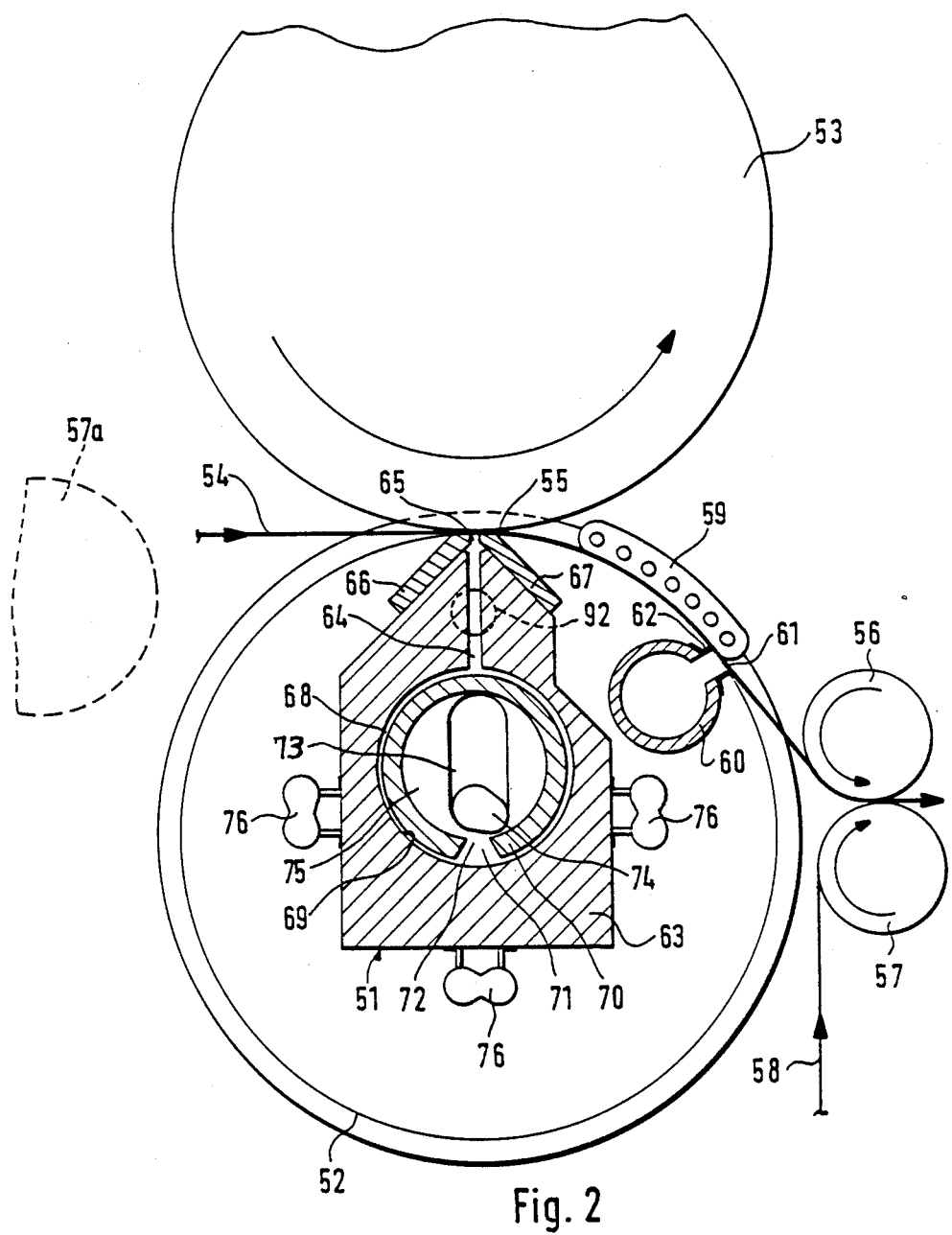
FIG. 2 shows a diagrammatic representation of cooperating elements of the apparatus according to FIG. 1 with a cross-sectionally shown feed head.

The feed head 51 of the present invention is shown in FIG. 2 arranged in a rotating, perforated metal cylinder 52, which cooperates with a counterroller 53. In this embodiment, the substrate 54 to be coated passes through a gap 55 between metal cylinder 52 and counterroller 53, also passes around the metal cylinder 52 and between two calender rollers 56, 57 and is brought into intimate contact with a further substrate 58. According to the invention, it is possible to adjust the region by which substrate 54 wraps around metal cylinder 52 by adjusting the calender rollers 56,57 up to calender roller 57a indicated in broken line form. It is obviously possible to have a certain preheating of substrate 54 prior to entering the gap 55 on metal cylinder 52.

According to the invention, following gap 55 there is a diagrammatically represented cooling or heating section 59, which makes it possible to determine the penetration depth of the substance points applied to substrate 54 by feed head 51 through said perforated metal cylinder.

In the present embodiment, in the vicinity of the cooling or heating section 59 an air nozzle 60 is provided in the rotary metal cylinder 52, which has a nozzle slit 61 directed towards said cYlinder 52 and which is also bounded by lips 62. By means of the air nozzle 60, the points to be transferred to the substrate are blown out of the perforations of metal cYlinder 52. As desired, the medium for the air nozzle 60 can be hot or cold. The position of the air nozzle 60 relative to gap 55 or the cooling or heating section 59 is also adjustable, as a function of when a final transfer of the substance points is to take place. This essentially determines the penetration of a substance point into the substrate. If, for example, a deeper penetration of the substance point into the substrate is required, so that said point possibly even punctures or breaks through, then section 59 acts as a heating section. However, if such a breakthrough is to be prevented and there is only to be a surface adhesion of the substance point to the substrate, then section 59 is used as a cooling section.

Feed head 51 Comprises a beam 63, which Can extend over the entire axial length of metal cylinder 52. Beam 63 has an upwardly directed slit nozzle 64 from which the substance can pass into the perforations of metal cylinder 52. At its orifice 65, the slit nozzle 64 is bounded by two profile strips 66,67, profile strip 67 cutting off the substance entering the perforations of metal cylinder 52 and also exerting a certain scraping effect on the inner wall of said cylinder 52. Through the production of perforations in metal cylinder 52, experience has shown that ridges form and over a period of time they can be filled up or oxidized by the substance. Thus, prior to putting metal cylinder 52 into use, the inner walls should be rebored or coated with Teflon or silicone, so that a completely smooth inner surface is obtained. For reasons of temperature measurement and the non-wetability of metal cylinder 52, the outside of the latter and also the inner wall of the holes should be coated with Teflon.

In the interior of beam 63, the slit nozzle 64 issues into a ring duct 63, which is formed by an axial bore 69 in beam 63, as well as by a tube 70 inserted into it. This tube 70 has a slot-like outlet 71 towards ring duct 68, said outlet 71 also being connected to a gap outlet 72 of a further feed tube 73. By means of said feed tube 73 the melted substance is fed in, gap outlet 72 being displaceable or variable and for this purpose an eccentric 74 is provided.

Together the feed tube 73 and tube 70 form heating duct 75, in which there is a heat carrier. The heat carrier is preferably constituted by thermal oil. These heating ducts 75 form a large heat exchanger surface, so that the temperature control within the beam 63 is much more precise.

In addition, there are further regulatable heating devices 76 around beam 63 and supply heat to the metal cylinder 52.

Figure 3:
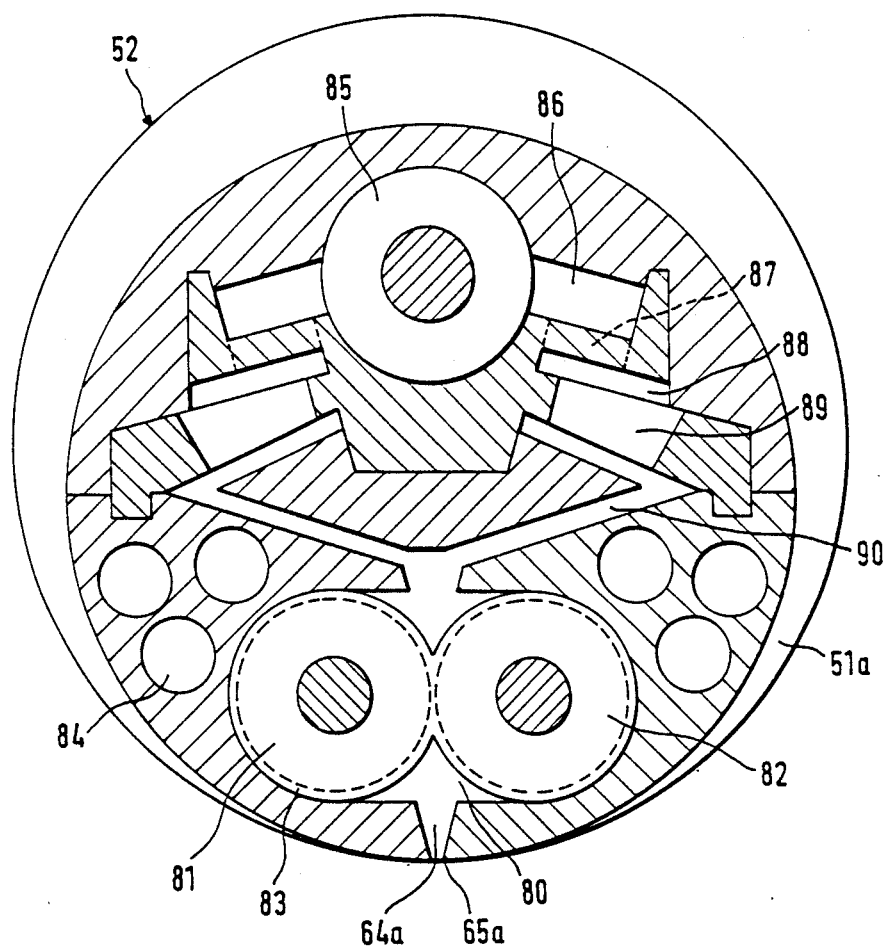
FIG. 3 shows a cross-section through other embodiment of a feed head.

A further feed head 51a of the present invention is shown in FIG. 3 in a diagrammatically indicated metal cylinder 52. In the case of feed head 51a, a chamber 80 is provided upstream of slit nozzle 64a and in it two rollers 81,82 rotate in opposite directions. The circumferential surface of the rollers 81,82 is provided with an axial tooth sYstem 83, the two tooth sYstems 83 of rollers 81,82 meshing. This permits a portioning of the substance fed to the slit nozzle 64. However, this arrangement also makes it possible on switching rollers 81,82 into the opposite rotation direction to relieve the pressure on slit nozzle 64a, so that a dripping out of substance from nozzle orifice 65a is prevented.

Heating cartridges or ducts 84 pass through the complete feed head 51a, so that this embodiment onlY permits melting of the substance in feed head 51a. The substance, e.g. in the form of a granular material can be fed in by means of a feed screw. It then drops into lateral ducts 86, where it comes into intimate contact with the heated feed head wall. Melted substance then passes via bores 87 to further receptacles 88,89 and from there into a feed duct 90, which issues into chamber 80 above rollers 81,82.

In another, not shown embodiment according to the invention, the counter roller 53 according to FIG. 2 is to be replaced by a second feed head with metal cylinder, whose nozzle orifice faces nozzle orifice 64. This makes it possible to apply a substance to either side of a substrate, so as not to permit a breaking through of the substance and can therefore subsequently be covered with a further substrate on both sides. Through a precise control of the rollers, the substance points must be precisely superimposed.

According to the invention, the slit nozzle 64 can be frontally provided with the displaceable relief opening 92 shown in broken line form. Relief opening 92 can take the residual pressure from nozzle orifice 65 and also, prior to actual starting up, substance can be introduced, removed or the temperature measured.

It is also possible to work without the counter roller 53, the substrate 54 passing taut in the vicinity of gap 55 or the adjacent circumferential areas of the metal cylinders. This has the additional advantage that substrate 54 is raised somewhat from the metal cylinder 52 on applying the substance points, so that there is a further substance action.

We claim:

1. Apparatus for applying liquid, pasty or plastic substances to a substrate, particularly thermoplastic substances, which comprises: a device for melting said substances; a perforated metal cylinder connected to said melting device, said cylinder having an interior and an inner surface; a feed head for transferring the melted substances to the substrate constructed as a beam arranged in the interior of the cylinder; at least one nozzle orifice of said feed head, wherein the inner surface of the cylinder moves past the nozzle orifice; and an air nozzle within the cylinder downstream of the nozzle orifice, said air nozzle forming a nozzle slit towards the metal cylinder defined by lips.

2. Apparatus according to claim 1 including means for wrapping the substrate around the metal cylinder following the metal orifice and up to the air nozzle.

3. Apparatus according to claim 1 including two profile strips forming the nozzle orifice which pass over the inner surface of the metal cylinder.

4. Apparatus according to claim 1 including heating devices for heating the metal cylinder associated with said beam.

5. Apparatus according to claim 1 wherein said beam with nozzle orifice is upwardly oriented towards the metal cylinder.

6. Apparatus according to claim 1 including a chamber connected to the nozzle orifice provided within the feed head, two rollers in the chamber rotatable in opposite directions having tooth systems on their circumferential surfaces which mesh.

7. Apparatus according to claim 1 including a cooling or heating section arranged between the nozzle orifice and air nozzle outside the metal cylinder.

8. Apparatus according to claim 7 wherein the air nozzle is adjustably arranged along the metal cylinder.

9. Apparatus according to claim 1 including a calendar roller pair downstream of said air nozzle, wherein the substrate passes through the calendar roller pair together with a further substrate to be joined.

10. Apparatus according to claim 9 wherein the calendar roller pair is adjustably arranged along the metal cylinder.

11. Apparatus according to claim 1 including a feed screw of said feed head and lateral ducts to said feed screw, wherein said substances are brought to the lateral ducts by said feed screw.

12. Apparatus according to claim 11 including bores for carrying the melted substances to the nozzle orifice connected to said lateral ducts, receptacles connected to said bores, and feed ducts connected to said receptacles and to the nozzle orifice.

13. Apparatus according to claim 12 including a chamber and rollers therein connected to said nozzle orifice.

14. Apparatus according to claim 1 wherein said feed head includes a ring duct in said beam having an axial bore, a tube in said ring duct with radial spacing in said axial bore, and a slit nozzle connecting said nozzle orifice to said ring duct.

15. Apparatus according to claim 14 wherein said tube includes an outlet, and a feed pipe having a gap outlet connected to said outlet.

16. Apparatus according to claim 15 including heating ducts between the tube and the feed pipe for a heat carrier.

17. Apparatus according to claim 16 wherein the gap outlet is variable.

18. Apparatus according to claim 17 wherein the gap outlet is variable by means of an eccentric.

* * * * *